US008814769B2

(12) United States Patent
Fujioka et al.

(10) Patent No.: US 8,814,769 B2
(45) Date of Patent: Aug. 26, 2014

(54) MACHINE TOOL AND TOOL HOLDER

(75) Inventors: Kazuya Fujioka, Yamatokoriyama (JP);
Yohei Shinkai, Yamatokoriyama (JP);
Katsuhito Miyahara, Yamatokoriyama
(JP); Kaoru Yasumatsuya,
Yamatokoriyama (JP)

(73) Assignee: DMG Mori Seiki Co., Ltd.,
Yamatokoriyama-shi (JP)

( * ) Notice: Subject to any disclaimer, the term of this patent is extended or adjusted under 35 U.S.C. 154(b) by 992 days.

(21) Appl. No.: 12/900,853

(22) Filed: Oct. 8, 2010

(65) Prior Publication Data
US 2011/0107573 A1  May 12, 2011

(30) Foreign Application Priority Data
Nov. 10, 2009  (JP) ................................. 2009-257150

(51) Int. Cl.
*B23Q 3/155* (2006.01)
*B23Q 3/157* (2006.01)
*B23Q 11/08* (2006.01)
*B23P 23/02* (2006.01)
*B23B 11/00* (2006.01)
*B23C 9/00* (2006.01)
*B23B 3/06* (2006.01)

(52) U.S. Cl.
CPC ........ *B23Q 3/15513* (2013.01); *B23Q 3/15766*
(2013.01); *B23Q 11/08* (2013.01); *B23Q*
*11/0883* (2013.01); *B23B 2270/60* (2013.01);
*B23B 11/00* (2013.01); *B23B 3/065* (2013.01)
USPC ...... 483/18; 483/22; 483/26; 483/3; 29/27 A;
409/144; 82/122

(58) Field of Classification Search
CPC .. B23Q 3/15513; B23B 2270/60; B23P 23/02
USPC ...... 483/18, 17, 22, 26, 32, 3; 29/27 R, 27 C,
29/27 A, 26 A, 560; 409/230, 144; 82/122,
82/1.2
See application file for complete search history.

(56) References Cited

U.S. PATENT DOCUMENTS 4,432,258 A * 2/1984 Currer .............................. 82/1.2
4,570,313 A * 2/1986 Holmstrom et al. .......... 29/27 C
(Continued)

FOREIGN PATENT DOCUMENTS

EP      259517 A1 *  3/1988
EP    2123379 B1 * 11/2009
(Continued)

*Primary Examiner* — Erica E Cadugan
(74) *Attorney, Agent, or Firm* — Oblon, Spivak, McClelland, Maier & Neustadt, L.L.P.

(57) ABSTRACT

A machine tool having a turning function and a milling function includes a spindle, a spindle housing supporting the spindle in a rotatable manner, a main clamp provided at the spindle, an auxiliary clamp provided at the spindle housing, and a double arm with a first gripper and a second gripper. The auxiliary clamp clamps a tool holder together with the main clamp during fixing a fixed tool. The double arm exchanges a tool holder grasped at the first gripper for another tool holder grasped at the second gripper by rotating and sliding movements. The auxiliary clamp is arranged at a position not interfering with the double arm that moves during exchanging tool holders. By such a configuration, a machine tool achieving a clamping force sufficient to withstand the load during a turning process, and that allows tool exchange in a short period of time, and a tool holder employed in such a machine tool, can be provided.

5 Claims, 8 Drawing Sheets

(56) References Cited

U.S. PATENT DOCUMENTS

| | | | |
|---|---|---|---|
| 4,596,502 A * | 6/1986 | Cattani | 409/144 |
| 4,621,548 A * | 11/1986 | Kubo et al. | 82/1.2 |
| 4,716,647 A * | 1/1988 | Winkler et al. | 483/22 |
| 4,777,713 A * | 10/1988 | Kitamura | 483/22 |
| 5,246,414 A * | 9/1993 | Hallbach | 483/3 |
| 5,853,358 A * | 12/1998 | Takenaka | 483/3 |
| 6,073,323 A * | 6/2000 | Matsumoto | 29/27 C |
| 7,220,089 B2 * | 5/2007 | Nakamura et al. | 409/233 |
| 7,367,097 B2 * | 5/2008 | Nakamura et al. | 29/27 C |
| 2008/0178451 A1 * | 7/2008 | Kume et al. | 29/428 |

FOREIGN PATENT DOCUMENTS

| | | | |
|---|---|---|---|
| EP | 2505285 A1 * | 10/2012 | |
| JP | 62-104833 | 7/1987 | |
| JP | 10-015715 A * | 1/1998 | |
| JP | 2001-162486 A * | 6/2001 | |
| JP | 2004-050324 A * | 2/2004 | |

* cited by examiner

MACHINE TOOL AND TOOL HOLDER

BACKGROUND OF THE INVENTION

1. Field of the Invention

The present invention generally relates to a machine tool and a tool holder. More particularly, the present invention relates to a machine tool having a turning function using a fixed tool and a milling function using a rotary tool, and a tool holder employed in such a machine tool.

2. Description of the Background Art

In the field of conventional machine tools, Japanese Utility Model Laying-Open No. 62-104833, for example, discloses a positioning device for a tool bit holder in a machine tool directed to setting the position of a cutting tool accurately (Patent Document 1).

As a positioning device for a tool bit holder disclosed in Patent Document 1, a spindle head of a turning center, for example, is envisaged. The spindle head includes a support sleeve, and a spindle supported rotatably in the support sleeve. The spindle is hollow. A main chuck for drawing in a main engagement section of a tool bit holder is mounted in a retractable manner at the center hole of the spindle. Four holes are formed in the support sleeve. An auxiliary chuck having a configuration similar to that of the main chuck for drawing in an auxiliary engagement section of the tool bit holder is loaded in each hole.

As an automatic tool changer (ATC) mounted on a machine tool, there is known a device for exchanging a tool holder loaded to the spindle for another tool holder, using a double arm having a gripper provided at either end, i.e. the so-called double arm scheme. An automatic tool changer of the double arm scheme can complete the tool exchange operation in a short period of time since the tool holder loaded to the spindle and another tool holder in a standby state are replaced simultaneously by a series of rotating and sliding movements of the double arm.

In the positioning device for a tool bit holder disclosed in the aforementioned Patent Document 1, the requirement of firmly coupling the tool bit holder with the spindle head to withstand a great cutting force is satisfied, not only by the coupling of the spindle with the tool bit holder by means of the main engagement section and main chuck, but also by the coupling of the support sleeve with the tool bit holder by means of a plurality of auxiliary engagement sections and auxiliary chucks.

In the positioning device for a tool bit holder disclosed in Patent Document 1, the auxiliary engagement sections are provided at the four corners of a tool bit holder formed in the shape of a square. An auxiliary chuck is provided at a position corresponding to a relevant auxiliary engagement section. In the case where an automatic tool changer of the double arm scheme is applied to a machine tool including a positioning device of such a tool bit holder, the double arm that moves over the end face of the support sleeve in association with the rotating motion will interfere with the coupling section between the auxiliary engagement section and auxiliary chuck during the tool exchange operation.

SUMMARY OF THE INVENTION

An object of the present invention is to provide a machine tool that can achieve a clamping force sufficient to withstand the load imposed during a turning process, and that allows tool exchange in a short period of time, and a tool holder employed in such a machine tool.

The machine tool according to the present invention has a turning function using a fixed tool, and a milling function using a rotary tool. The machine tool includes a rotatable spindle, a housing member supporting the spindle in a rotatable manner, a main clamp provided at the spindle, an auxiliary clamp provided at the housing member, and an arm member. The main clamp clamps a tool holder during fixing the fixed tool and rotary tool. The auxiliary clamp clamps a tool holder together with the main clamp during fixing the fixed tool. The arm member includes a first gripper and a second gripper capable of grasping tool holders. The arm member exchanges a tool holder loaded to the spindle and grasped by the first gripper for another tool holder grasped by the second gripper, by rotating about a central axis arranged at a center position between the first gripper and second gripper, and also sliding in an axial direction of the central axis. The auxiliary clamp is arranged at a position not interfering with the arm member that moves during exchanging the tool holders.

According to the machine tool configured as set forth above, the tool holder is clamped, not only by the main clamp provided at the spindle of the rotating side, but also by an auxiliary clamp provided at the housing member of the spindle supporting side, during fixing the fixed tool. Accordingly, even if excessive load acts on the tool during the turning process using the fixed tool, the tool holder can be held by a clamping force sufficient to withstand the load. Further, by arranging the auxiliary clamp at a position not interfering with the arm member that moves during exchanging the tool holders, the tool holders can be exchanged by the so-called double arm scheme, i.e. the tool holder loaded to the spindle can be replaced with another tool holder by a series of rotating and sliding movements of the arm member. Thus, the time required for tool exchange can be shortened.

When viewed from the direction of the rotation axis of the spindle, there is a rotation region where the arm member rotates during exchanging tool holders, above the housing member. Preferably, the auxiliary clamp is arranged at a position outside the rotation region. By a machine tool configured as set forth above, interference between the arm member rotating within the rotation region and the auxiliary clamp can be avoided.

More preferably, the auxiliary clamp is arranged at a side opposite of the center of rotation of the arm member, relative to the rotation axis of the spindle. By such a machine tool configured as set forth above, interference between the arm member arranged at one side and the auxiliary clamp arranged at the other side of the rotation axis of the spindle can be avoided.

Preferably, the auxiliary clamp includes a fit section. The fit section is formed with a tapered face where the diameter varies along a retracting direction of the tool holder. The fit section fits with the tool holder in a state where the tapered face forms surface-contact during clamping. By such a machine tool as set forth above, the provision of a fit section formed with a tapered face at the auxiliary clamp allows the load imposed during the turning process to be received at the fit section. Accordingly, the load on the spindle can be prevented from acting excessively during the turning process.

The auxiliary clamp includes a body having a hole formed, opened towards a working area from the housing member, and a clamp mechanism arranged in the hole for holding a tool holder. Preferably, the machine tool further includes a lid member provided to block the opening of the hole when a tool holder is not clamped by the auxiliary clamp, attached detachably to the body. By attaching a lid member to the body when a tool holder is not clamped by the auxiliary clamp according to the machine tool configured as set forth above, intrusion of foreign objects, generated during processing, can be prevented from entering the hole where the clamp mechanism is arranged. Thus, the clamp mechanism can be protected appropriately.

A tool holder according to the present invention is employed in a machine tool having a turning function and a milling function, and is loaded to the spindle of the machine tool in the turning process. The tool holder is exchangeable through an automatic tool changer. The tool holder includes a tapered section, a main retraction section, at least one auxiliary retraction section, and a block member. The tapered section is formed with a tapered face where the diameter varies along the axis line of a predetermined axis. The main retraction section is provided on the axis line of the predetermined axis, receiving a pulling force from the spindle side of the machine tool along the direction of the axis line of the predetermined axis. The at least one auxiliary retraction section is positioned radially apart from the predetermined axis, receiving a pulling force, parallel to the main retraction section, from the spindle side of the machine tool. The block member includes a tool bit attachment section at a site radially apart from the predetermined axis, to which a tool bit for use in a turning process is attached in a detachable manner. The block member has the tapered section, main retraction section, and the auxiliary retraction section formed continuously. All the auxiliary retraction sections are arranged at one of a first range and a second range, wherein the first range is defined spanning over an angle of 180° centered on the phase angle where the tool bit attachment section is provided, and the second range is defined spanning over an angle of 180° at the opposite side thereof, around the axis of the predetermined axis.

By arranging all the auxiliary retraction sections at one of the first range and second range around the axis of a predetermined axis according to the tool holder configured as described above, the other of the first range and second range can be used as a region where tool exchange is to be performed by the automatic tool changer.

According to the present invention, there can be provided a machine tool achieving a clamping force sufficient to withstand the load during a turning process, and that allows tool exchange in a short period of time, and a tool holder employed in such a machine tool.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
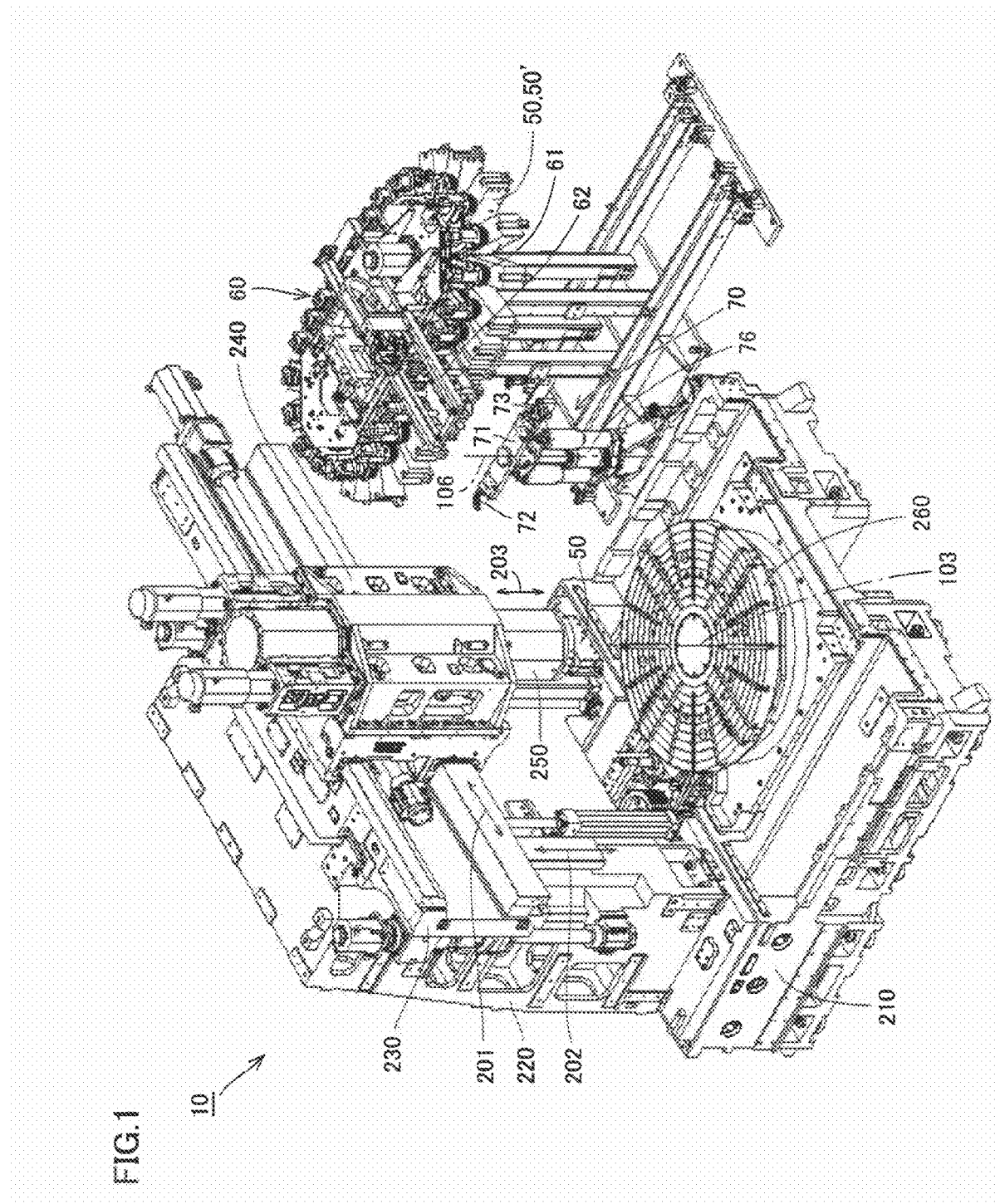
FIG. 1 is a perspective view of a machine tool according to an embodiment of the present invention.

Embodiments of the present invention will be described with reference to the drawings. In the drawings referred to hereinafter, the same or corresponding members have the same reference number allotted.

Configuration of Machine Tool

Referring to the perspective view of FIG. 1, a machine tool 10 according to an embodiment of the present invention has a turning function using a fixed tool, and a milling function using a rotary tool. Machine tool 10 is a lathe having a milling function. Machine tool 10 is a vertical lathe for cutting a workpiece (work) held at a table by a rotary movement of a table centered about a vertical axis, and a feeding movement of a tool bit that is a fixed tool.

The entire configuration of machine tool 10 according to the present embodiment will be first described. Machine tool 10 includes, as the main component, a bed 210, a column 220, a cross rail 230, a saddle 240, a ram 250, and a table 260.

Bed 210 is a base member to support column 220, table 260, and the like, situated on an installation face such as at a factory. Column 220 is attached to bed 210 in an upright position from the top face of bed 210. Cross rail 230 is attached to column 220 in a slidable manner thereto in the axial direction indicated by arrow 202 (the ZB axis direction).

Saddle 240 is attached to cross rail 230 in a slidable manner thereto in the axial direction indicated by arrow 201 (the X axis direction). Ram 250 is attached to saddle 240 in a slidable manner thereto in the axial direction indicated by arrow 203 (the Z axis direction). Ram 250 is mounted with a spindle 21 that will be described afterwards. A tool holder 50 for holding a fixed tool or a tool holder 50' (not shown in FIG. 1) for holding a rotary tool is loaded to spindle 21 in a detachable manner.

A feeding mechanism, a guiding mechanism, a servo motor, and the like are provided appropriately with respect to column 220, cross rail 230, saddle 240, and ram 250 to allow the sliding movement of each component.

The ZB axis that is the axis of travel of cross rail 230 and the Z axis that is the axis of travel of ram 250 are parallel to each other and extend in the vertical direction. The X axis that is the axis of travel of saddle 240 is orthogonal to the ZB axis and the Z axis, and extends in the horizontal direction. By a combination of the sliding movements of each of cross rail 230, ram 250, and saddle 240 in machine tool 10 of the present embodiment, the site of machining the work by the tool loaded to tool holder 50, 50' is shifted arbitrarily on the X-Z plane.

The machine tool of the present invention is not limited to the above-described construction, and may be configured having a structure slidable in the direction of the Y axis orthogonal to the X axis and Z axis. In this case, the site of machining the work by a tool loaded to the tool holder is shifted three-dimensionally.

Table 260 is provided rotatable by a motor drive, about a central axis 103 extending vertically. The work is held on table 260 by means of a chuck and/or various types of jigs. During a turning process using a fixed tool, the work rotates about central axis 103 together with the rotation of table 260. A turning process is conducted by moving the fixed tool close to the rotating work. During a milling process using a rotary tool, table 260 is basically stationary. A milling process is conducted by moving the rotary tool close to the work secured on table 260.

The structure of the spindle of machine tool 10 and the structure of the clamp of the tool holder will be described hereinafter with reference to the sectional views of FIGS. 2, 3 and 4.

Figure 2:
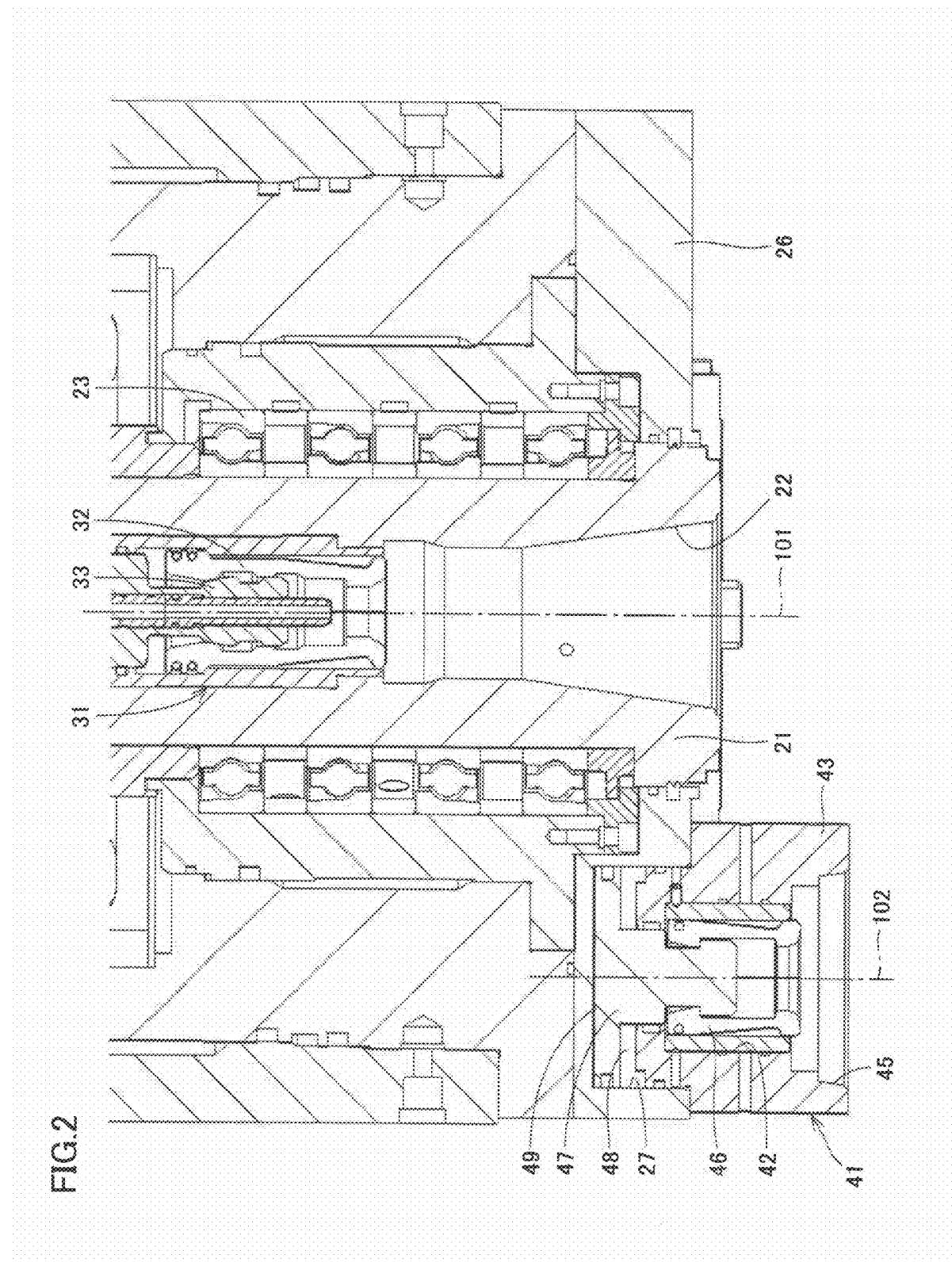
FIG. 2 is a sectional view of a configuration around the spindle provided at the machine tool of FIG. 1.
Figure 3:
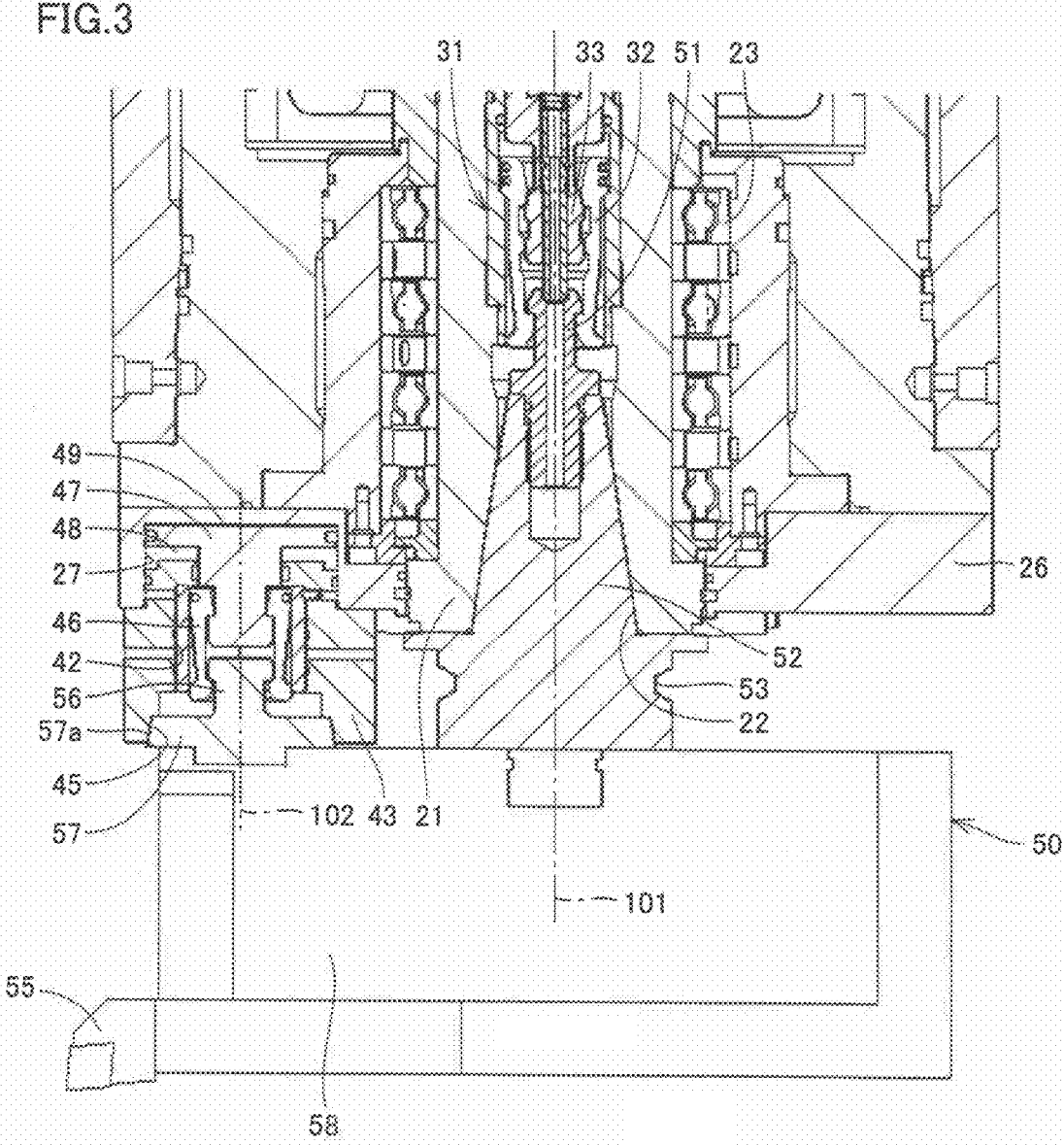
FIG. 3 is a sectional view around the spindle of FIG. 2, representing a state having a fixed tool loaded.
Figure 4:
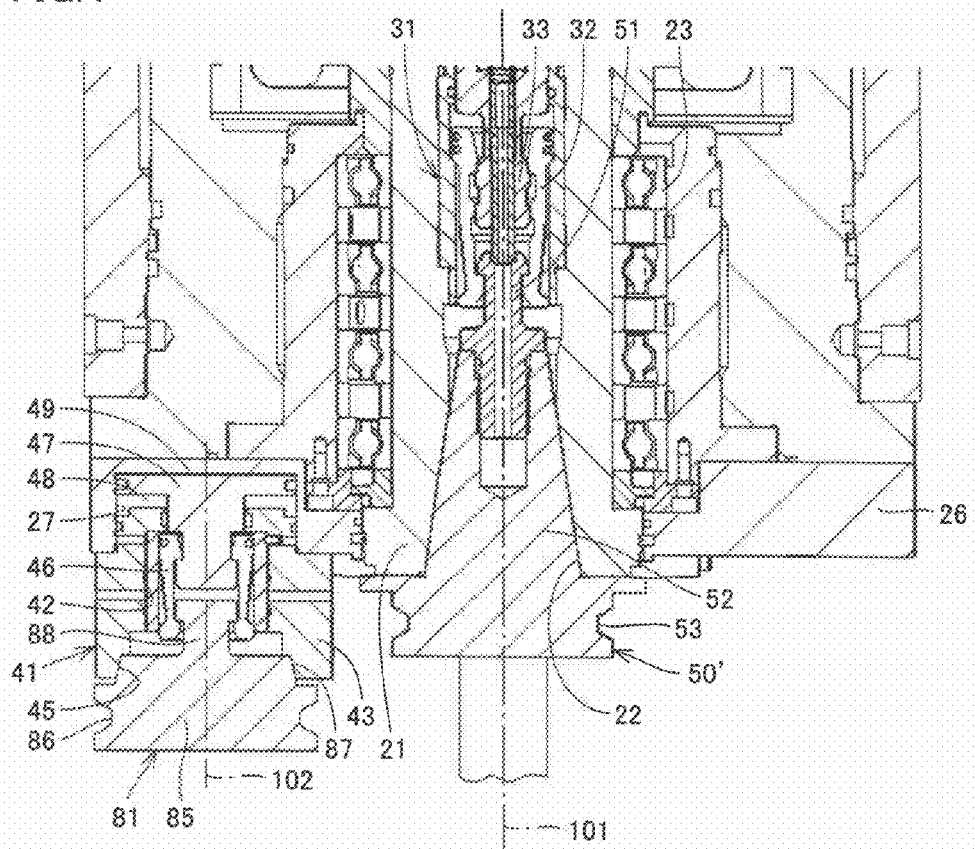
FIG. 4 is a sectional view around the spindle of FIG. 2, representing a state having a rotary tool loaded.

Referring to FIGS. 2-4, machine tool 10 further includes, as the main component, a spindle 21, a spindle housing 26, a main clamp 31, and an auxiliary clamp 41.

Spindle 21 has a cylindrical configuration extending in the axial direction of central axis 101. Spindle 21 is provided rotatable by a motor drive, centered about a central axis 101 extending vertically. In other words, spindle 21 is a rotating body rotating about central axis 101. Spindle 21 has a tapered face 22 formed, opened at its end face. Tapered face 22 is formed such that the diameter corresponding to a plane cut off at right angles to central axis 101 becomes larger as a function of approaching the end face of the spindle in the axial direction of central axis 101.

Spindle housing 26 is formed of an assembly of a plurality of components, having a cylindrical configuration extending in the axial direction of central axis 101 as a whole. Spindle housing 26 is arranged to cover the outer perimeter of spindle 21. In other words, spindle 21 is disposed at the inner side of spindle housing 26. Spindle 21 is supported rotatably to spindle housing 26 by a bearing 23 provided between the outer circumferential face of spindle 21 and the inner circumferential face of spindle housing 26. In other words, spindle housing 26 is a support member, qualified as the supporting side, of spindle 21 that is a rotating body, and a fixeing member that does not rotate.

Main clamp 31 is provided inside spindle 21 on the axis line of central axis 101. Main clamp 31 is arranged at the rear side of tapered face 22, viewed from the spindle end face. Main clamp 31 functions to hold a tool holder 50 for holding a fixed tool (refer to FIG. 3) at spindle 21 in a turning process, and to hold a tool holder 50' for holding a rotary tool (refer to FIG. 4) at spindle 21 in a milling process.

The configuration of main clamp 31 will be described more specifically. Main clamp 31 is constituted of a collet 32 and a collet open/close member 33.

Collet 32 has a claw shape engageable with a pull stud bolt 51 provided at tool holder 50, 50', and is arranged in a hollow sleeve shape centered about central axis 101. Collet open/close member 33 is provided inside spindle 21 in a movable manner along the axial direction of central axis 101. Collet open/close member 33 is arranged such that its tip is accommodated within collet 32. By a driving device not shown utilizing hydraulic pressure, spring force, pneumatic pressure, or the like, collet open/close member 33 is advanced/retracted along the axial direction of central axis 101 to reduce/increase the diameter of collet 32.

In conjunction with the reduction of the diameter of collet 32, pull stud bolt 51 of tool holder 50, 50' is retracted in the axial direction of central axis 101 while being held by collet 32, whereby tool holder 50 is clamped relative to spindle 21. In conjunction with the increase of the diameter of collet 32, pull stud bolt 51 of tool holder 50, 50' is released from collet 32, whereby tool holder 50 is unclamped from spindle 21.

Auxiliary clamp 41 is provided at spindle housing 26. Auxiliary clamp 41 is arranged on the axial line of central axis 102 radially apart from central axis 101. Spindle housing 26 has a recess 27 with a bottom, opened at its end. Auxiliary clamp 41 is loaded at recess 27. Auxiliary clamp 41 is provided to protrude from the end face of spindle 21 in the axial direction of central axes 101 and 102. Auxiliary clamp 41 functions to hold tool holder 50 for holding a fixed tool (refer to FIG. 3) during a turning process at spindle housing 26. Auxiliary clamp 41 functions to clamp tool holder 50 and secure clamp tool holder 50 to spindle housing 26, in addition to positioning tool holder 50 relative to spindle housing 26. As shown in FIG. 4, auxiliary clamp 41 is not used for clamping tool holder 50' for holding a rotary tool during a milling process.

The configuration of auxiliary clamp 41 will be described more specifically. Auxiliary clamp 41 includes a collet 46, a collet open/close member 47, and an auxiliary clamp body 43 as a fitting section or body section. Collet 46 and collet open/close member 47 constitute the clamp mechanism for holding tool holder 50.

Auxiliary clamp body 43 is formed with a hole 42 having a hollow cylindrical shape. Hole 42 opens from spindle housing 26 towards a working area partitioned with a splash guard, and where the work is processed (working area 82 in FIG. 7 that will be described afterwards). Auxiliary clamp body 43 is fitted in recess 27 in a manner protruding from the end face of spindle housing 26. Collet 46 is arranged in hole 42. Collet 46 has a claw shape allowing retraction of pull stud bolt 56 provided at tool holder 50, and is arranged in a hollow sleeve shape about central axis 102. Collet open/close member 47 is arranged such that its tip is accommodated within collet 46. Collet open/close member 47 is provided inside recess 27, movable in the axial direction of central axis 102.

A hydraulic chamber 48 and a hydraulic chamber 49 are provided at the front and back of collet open/close member 47 in the axial direction of central axis 102. Feeding oil to hydraulic chamber 48 causes collet open/close member 47 to move backwards of the spindle, whereby the diameter of collet 46 is reduced. Feeding oil to hydraulic chamber 49 causes collet open/close member 47 to move forward of the spindle, whereby the diameter of collet 46 increases. In conjunction with the reduction of the diameter of collet 46, pull stud bolt 56 of tool holder 50 is retracted in the axial direction of central axis 102 while being held by collet 46, whereby tool holder 50 is clamped relative to spindle housing 26. In conjunction with the increase of the diameter of collet 46, pull stud bolt 56 of tool holder 50 is released from collet 46, whereby tool holder 50 is unclamped from spindle housing 26.

In a turning process, excessive cutting load will act on the tool bit that is a fixed tool. For example, a maximum cutting force greater than or equal to 30000 N is applied. In machine tool 10 of the present embodiment, tool holder 50 is clamped, not only by main clamp 31 provided at spindle 21 of the rotating side, but also by auxiliary clamp 41 provided at spindle housing 26 at the supporting side of spindle 21 during fixing a fixed tool. Thus, even if excessive force acts on the tool bit during a turning process, tool holder 50 can be held by a clamping force sufficient to withstand the load.

Referring to FIG. 3, machine tool 10 of the present embodiment has a tapered face 45 formed at auxiliary clamp body 43. Tapered face 45 is formed such that the diameter corresponding to a plane cut off at right angles to central axis 102 varies along the retracting direction of tool holder 50. Specifically, tapered face 45 is formed such that the diameter corresponding to a plane cut off at right angles to central axis 102 is increased as a function of approaching the end face of spindle housing 26 in the axial direction of central axis 102. During clamping of tool holder 50, auxiliary clamp body 43 fits with a base 57 of tool holder 50 in a surface-contacting state with tapered face 45.

According to the configuration set forth above, the load during the turning process can be received at the tapered region of auxiliary clamp body 43. Accordingly, the load on spindle 21 can be prevented from acting excessively during the turning process.

Referring to FIG. 4, machine tool 10 of the present embodiment further includes an auxiliary clamp lid 81 as a lid member. Auxiliary clamp lid 81 is detachably attached to auxiliary clamp body 43. The opening of hole 42 formed at auxiliary clamp body 43 is blocked in a state where auxiliary clamp lid 81 is attached to auxiliary clamp body 43.

Auxiliary clamp lid 81 is provided to be detachable automatically by means of an automatic tool changer 70 that will be described afterwards. Specifically, auxiliary clamp lid 81 includes a pull stud bolt 88 and a base 85. Pull stud bolt 88 is a member corresponding to pull stud bolt 56 of tool holder 50 that will be described afterwards, and retracted by collet 46. Base 85 is a member corresponding to base 57 of tool holder 50 that will be described afterwards. Base 85 is formed with a tapered face 87 to be brought into surface-contact with tapered face 45, corresponding to tapered face 57a of tool holder 50. Base 85 includes a groove 86 that has a cross section of substantially a V shape, into which gripper 72/73 (refer to FIG. 7) of double arm 71 provided at automatic tool changer 70 is fitted.

As mentioned above, auxiliary clamp 41 is not used for clamping tool holder 50' for holding a rotary tool during a milling process. By blocking the opening of hole 42 by means of auxiliary clamp lid 81 in this case, debris, oil and the like from the work encountered in a milling process can be prevented from entering auxiliary clamp body 43. Accordingly, the clamp mechanism of auxiliary clamp 41 constituted of collet 46 and collet open/close member 47 can be protected appropriately.

In the event of attaching a rotary tool for use in a honing process, a pin extending from the rotary tool side may be inserted into a hole 42 formed at auxiliary clamp 41 to disable rotation of the rotary tool. In this case, auxiliary clamp lid 81 does not have to be attached to auxiliary clamp body 43.

The configuration of an automatic tool changer and peripheral device provided at machine tool 10 will be described hereinafter. Referring to FIG. 1, machine tool 10 further includes, as the main component, an automatic tool changer 70 and a tool magazine 60.

Tool magazine 60 is capable of accommodating a plurality of tool holders 50 and 50' used in a turning process or milling process. The plurality of tool holders 50 and 50' are stored in tool magazine 60 in a state held by a plurality of tool pots 61 provided at equal interval to an endless chain. A predetermined tool pot 61 is shifted to the site of a shifter 62 that will be described afterwards by the circulation of the endless chain through a motor drive.

Figure 5:
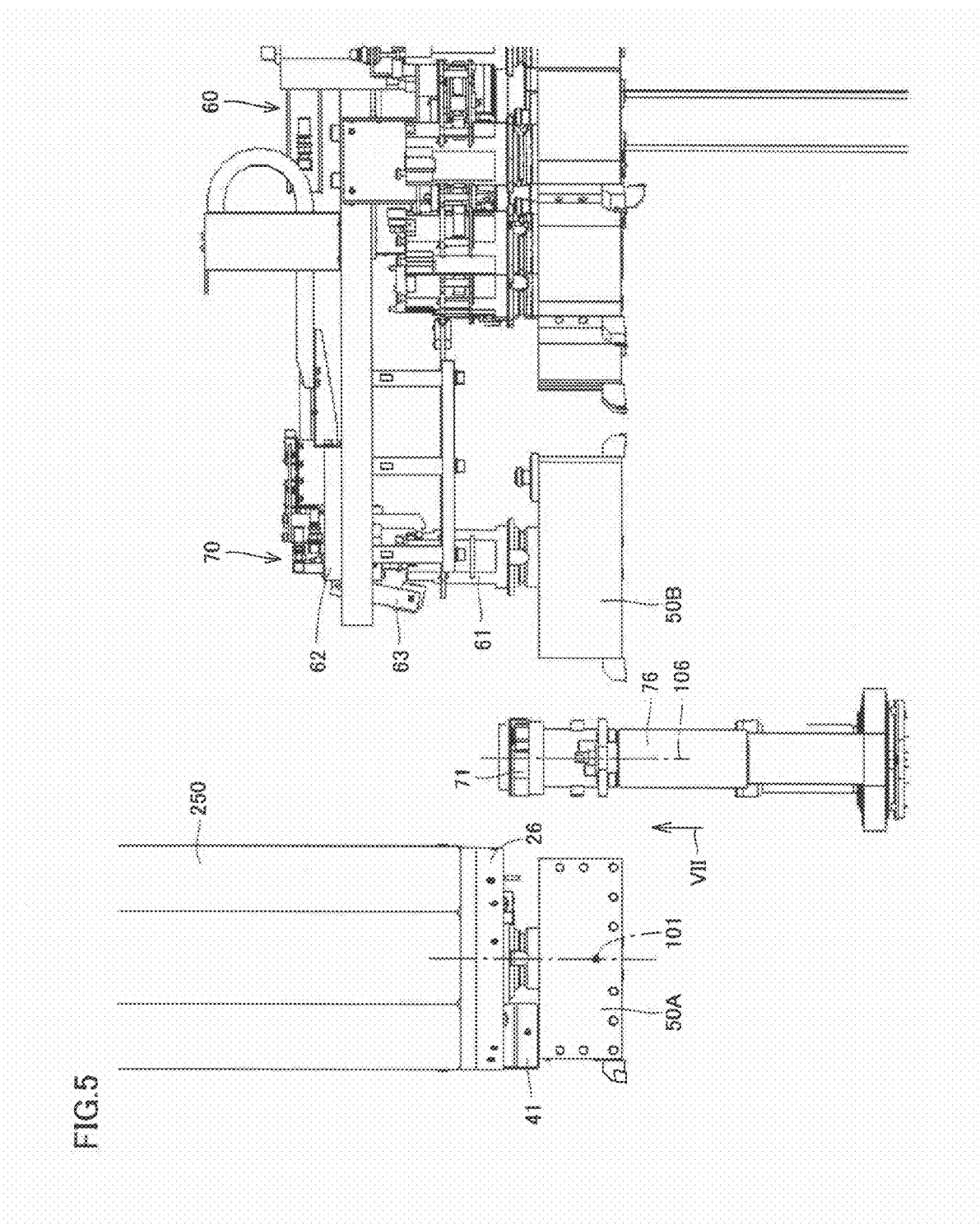
FIG. 5 is a front view of the neighborhood of an automatic tool changer, representing a first state during tool exchange.
Figure 6:
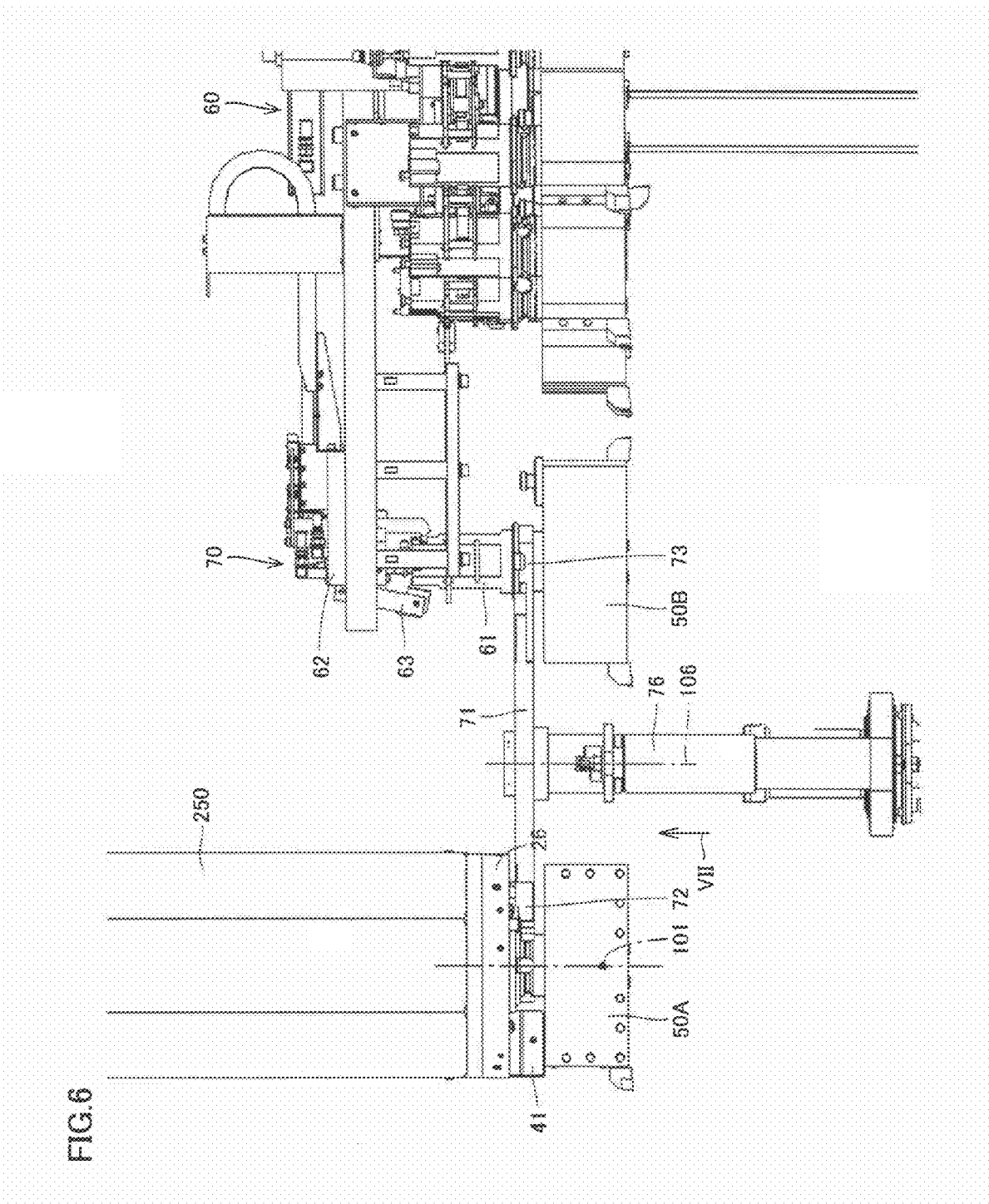
FIG. 6 is a front view of the neighborhood of the automatic tool changer, representing a second state during tool exchange.

FIGS. 5 and 6 are front views around the automatic tool changer representing a first state and a second state, respectively, during tool exchange. FIGS. 5 and 6 typically represent the state of exchanging tool holder 50A for use in a turning process for another tool holder 50B.

Referring to FIGS. 1, 5 and 6, automatic tool changer 70 is capable of automatically exchanging tool holder 50, 50' loaded to spindle 21 for another tool holder 50, 50' prepared at tool magazine 60. Automatic tool changer 70 includes a shifter 62, a double arm 71, and a driving device 76.

A driving device such as an air cylinder, and a pot gripper 63 driven by the driving device constitute shifter 62, for example. Pot gripper 63 can grasp a tool pot 61. Pot gripper 63 is driven by the driving device to move back and forth between a tool exchange position and an indexing position of tool magazine 60.

Double arm 71 includes a gripper 72 and a gripper 73 capable of grasping tool holder 50, 50'. Double arm 71 is formed extending in one direction between gripper 72 and gripper 73. Double arm 71 is provided rotatable about a central axis 106 located at the center position between grippers 72 and 73, and slidable in the axial direction of central axis 106. In the present embodiment, central axis 106 extends in the vertical direction. In other words, double arm 71 slides in the vertical direction while rotating within the horizontal plane. Driving device 76 is formed of a hydraulic cylinder, a motor, and the like to cause double arm 71 to rotate and slide at a predetermined timing.

The step of exchanging tool holder 50A for use in a turning process for another tool holder 50B will be described hereinafter with reference to FIGS. 5-7.

For tool exchange, spindle 21 is moved to a tool exchange position in a working area 82. Double arm 71 is rotated 90° clockwise under a state in which ATC shutter 80 that blocks cutting area 82 from an out-of-working area 83 is open. At this stage, gripper 72 grasps tool holder 50A loaded to spindle 21, whereas gripper 73 grasps tool holder 50B held by tool pot 61 at shifter 62. The clamping of tool holder 50A by main clamp 31 and auxiliary clamp 41 is released at the timing of tool holder 50A being grasped by gripper 72.

Double arm 71 is rotated about central axis 106 while sliding in the axial direction of central axis 106. Accordingly, tool holder 50A attached by gripper 72 is moved towards a tool exchange site in out-of-working area 83, and tool holder SOB attached by gripper 73 is moved towards the tool exchange position in working area 82. When tool holders 50A and 50B approach the tool exchange site of each area, double arm 71 is slid in the axial direction of central axis 106. Accordingly, tool holder 50A attached by gripper 72 is inserted into tool pot 61, and tool holder SOB attached by gripper 73 is inserted into spindle 21. Tool holder 50B is clamped by main clamp 31 and auxiliary clamp 41. Then, double arm 71 is inverted to return to the former standby position shown in FIG. 5.

The above description is based on exchanging tool holder 50 for use in a turning process. The same applies to exchanging tool holder 50' for use in a milling process, provided that the clamping and unclamping of tool holder 50' are conducted only by main clamp 31.

Figure 7:
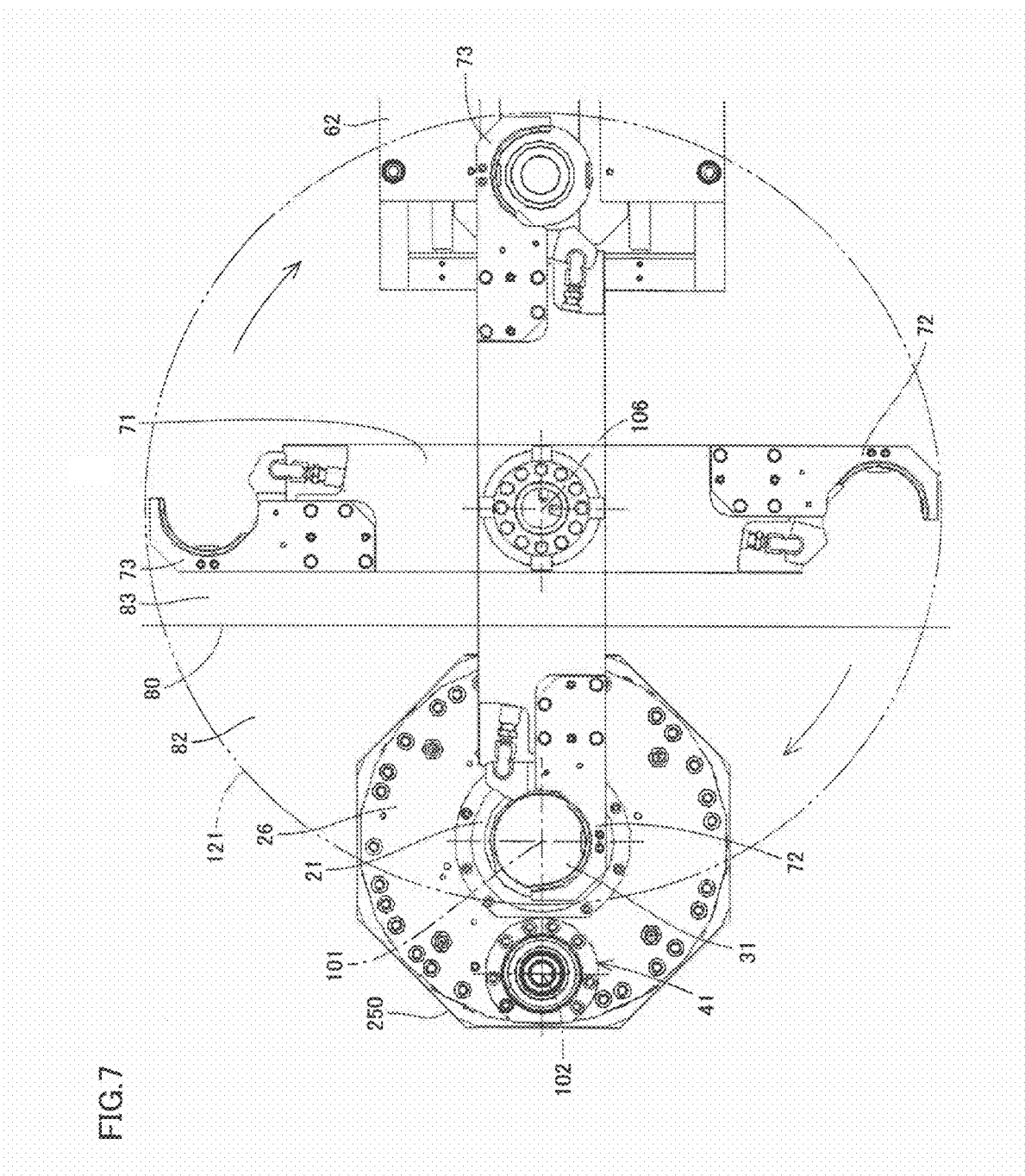
FIG. 7 represents the neighborhood of the automatic tool changer, viewed from the direction indicated by arrow VII in FIGS. 5 and 6.

Referring to FIG. 7, machine tool 10 of the present embodiment has auxiliary clamp 41 provided at a position not interfering with double arm 71 that rotates and slides during tool exchange. When viewed in the axial direction of central axis 101 that is the center of rotation of spindle 21, there is a rotation region 121 where double arm 71 rotates during tool exchange, above spindle housing 26. Rotation region 121 is present at the inner side of the track of the tip of double arm 71 moving about central axis 106. Auxiliary clamp 41 is situated at a position outside rotation region 121. Auxiliary clamp 41 is provided at the side opposite of central axis 106 that is the center of rotation of double arm 71, relative to central axis 101 that is the center of rotation of spindle 21.

Auxiliary clamp 41 is provided such that central axis 102 around which auxiliary clamp 41 is arranged is located on a line connecting central axis 101 that is the center of rotation of spindle 21 and central axis 106 that is the center of rotation of double arm 71. Auxiliary clamp 41 may be arranged such that central axis 102 is located deviated from the line connecting central axis 101 and central axis 106 if at a position outside rotation region 121.

By such a configuration, machine tool 10 of the present embodiment allows tool exchange by the double arm scheme in which tool holder 50 loaded to spindle 21 is exchanged for another tool holder 50 by a series of rotating and sliding movements of double arm 71.

The basic configuration of machine tool 10 according to an embodiment of the present invention is summarized in the following. Machine tool 10 of the present embodiment has a turning function using a fixed tool, and a milling function using a rotary tool. Machine tool 10 includes a rotatable spindle 21, a spindle housing 26 identified as a housing member supporting spindle 21 in a rotatable manner, a main clamp 31 provided at spindle 21, an auxiliary clamp 41 provided at spindle housing 26, and a double arm 71 identified as an arm member.

Main clamp 31 clamps tool holder 50, 50' during fixing a fixed tool and/or rotary tool. Auxiliary clamp 41 clamps tool holder 50 together with main clamp 31 during fixing the fixed tool. Double arm 71 includes a gripper 72 as a first gripper and a gripper 73 as a second gripper, capable of grasping tool holder 50, 50'. Double arm 71 exchanges tool holder 50, 50' loaded at spindle 21 and grasped by gripper 72 for another tool holder 50, 50' grasped by gripper 73 by rotating about central axis 106 located at the center position between gripper 72 and gripper 73, and also by sliding in the axial direction of central axis 106. Auxiliary clamp 41 is arranged at a position not interfering with double arm 71 that moves during exchanging tool holder 50.

Although the present embodiment has been described with one auxiliary clamp 41 provided at spindle housing 26, a plurality of auxiliary clamps 41 may be provided. In this case, all the auxiliary clamps 41 are arranged at a position not interfering with double arm 71, outside of rotation region 121.

The present embodiment is based on, but not limited to the present invention applied to a vertical lathe having a milling function. For example, the present invention is applicable to a composite working machine such as a lathe with a spindle tool or a machining center including a rotary table.

Configuration of Tool Holder

A configuration of tool holder 50 to hold a fixed tool during a turning process, employed in machine tool 10 of FIG. 1, will be described in detail hereinafter.

Figure 8:
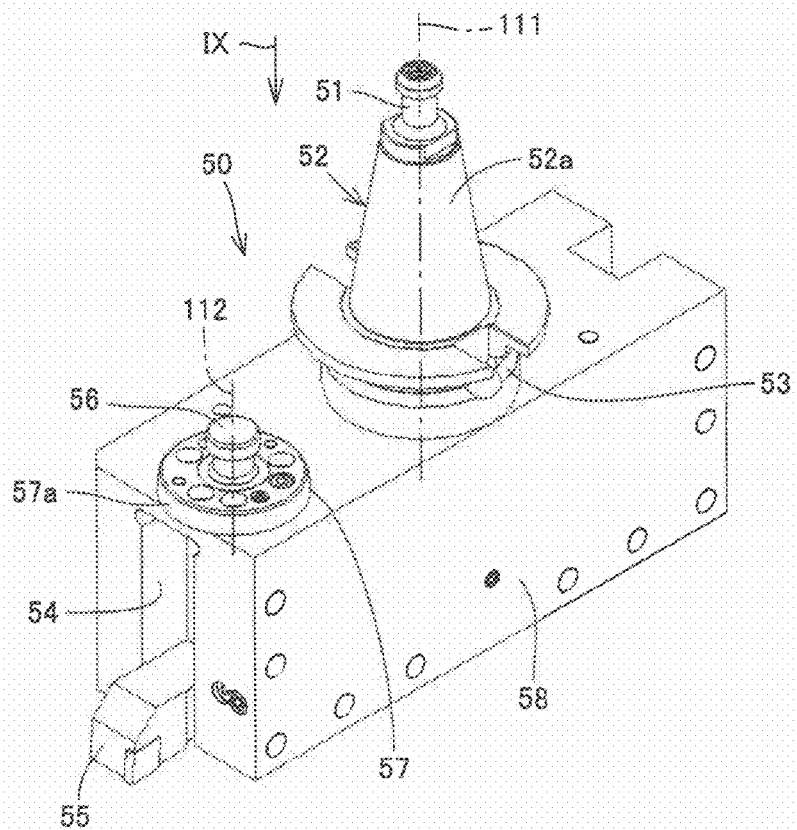
FIG. 8 is a perspective view of a tool holder for use in a turning process employed in the machine tool in FIG. 1.
Figure 9:
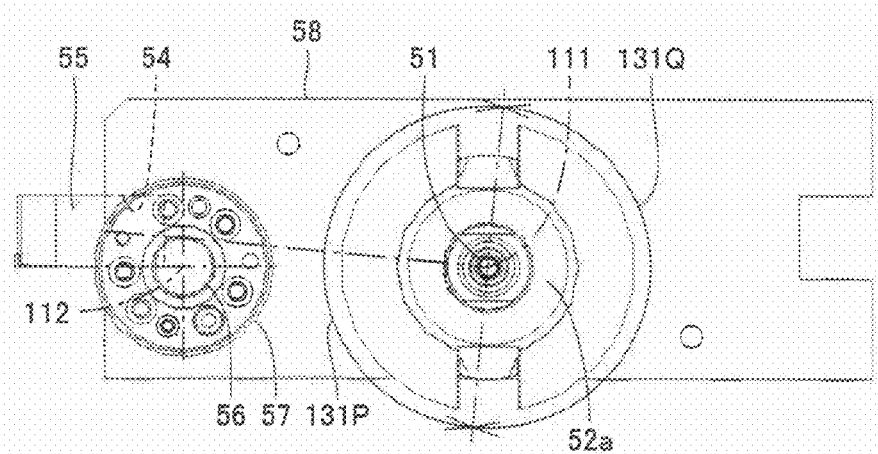
FIG. 9 represents a tool holder, viewed from the direction indicated by arrow IX in FIG. 8.

FIG. 8 is a perspective view of a tool holder for use in a turning process employed in the machine tool of FIG. 1. FIG. 9 represents a tool holder viewed from the direction indicated by arrow IX in FIG. 8.

Referring to FIGS. 3, 8 and 9, tool holder 50 functions to load a tool bit 55 that is a fixed tool to spindle 21 in a turning process. Tool holder 50 includes, as the main component, a shank 52, a pull stud bolt 51, a tool block 58, a pull stud bolt 56, and a base 57.

Shank 52 is formed with a tapered face 52a where the diameter corresponding to a plane cut off at right angles to central axis 111 varies along the axial direction of central axis 111. In the state where tool holder 50 is loaded to spindle 21, tapered face 52a forms surface-contact with tapered face 22 of the spindle side to receive the rotation torque transmitted from spindle 21. Shank 52 is formed with a groove 53 having a cross section of substantially a V shape, revolving about central axis 111. During tool exchange by automatic tool changer 70 described previously, gripper 72, 73 of double arm 71 fits in groove 53.

Pull stud bolt 51 is connected to shank 52. Pull stud bolt 51 is provided on the axial line of central axis 111. Pull stud bolt 51 is formed to extend column-like along the axial line of central axis 111. When tool holder 50 is loaded to spindle 21, pull stud bolt 51 receives a pulling force along the direction of the axial line of central axis 101 from the spindle 21 side in a state clasped by collet 32.

Pull stud bolt 56 is provided on the axial line of central axis 112 radially apart from central axis 111. Pull stud bolt 56 is formed to extend column-like along the axial line of central axis 112. Pull stud bolt 56 and groove 53 are provided at a site overlapping each other in the axial direction of central axis 111 and central axis 112. Pull stud bolt 51 is located at a position projecting outwardly than pull stud bolt 56 in the axial direction of central axis 111 and central axis 112. When tool holder 50 is loaded to spindle 21, pull stud bolt 56 receives a pulling force along the direction of the axial line of central axis 112 from the spindle 21 side, i.e. a pulling force in a direction parallel to pull stud bolt 56, in a state clasped by collet 46.

Base 57 has a disk shape of a diameter larger than that of pull stud bolt 56, and is provided in tandem with pull stud bolt 56 in the axial direction of central axis 112. Base 57 is formed integrally with pull stud bolt 56. Base 57 is formed with a tapered face 57a where the diameter corresponding to a plane cut off at right angles to central axis 112 varies along the axial direction of central axis 112. In a state where tool holder 50 is loaded to spindle 21, tapered face 57a is brought into surface-contact with tapered face 57 formed at auxiliary clamp body 43.

Tool block 58 has a general rectangular solid form as a whole. Tool block 58 is formed continuously with shank 52 and pull stud bolt 51, and further with pull stud bolt 56 via base 57. By such a configuration, shank 52 and pull stud bolt 51 are formed integrally with pull stud bolt 56 by tool block 58.

Tool block 58 is formed to extend, when viewed in the axial direction of central axis 111, in one radial direction of central axis 111 and radially in the opposite direction, 180° offset from the one direction. Tool block 58 has a tool bit attachment groove 54 at a position radially apart from central axis 111. Tool bit attachment groove 54 is formed to have a shape that allows insertion of tool bit 55 that is a fixed tool.

Around the axis of central axis 111, there are defined a range 131P spanning over an angle of 180° centered on the phase angle where tool bit attachment groove 54 is provided, and a range 131Q spanning over an angle of 180° at the opposite side thereof. The phase angle where tool bit attachment groove 54 is provided is the phase position of the center of tool bit attachment groove 54, around the axis of central axis 111, and corresponds to, in the present embodiment, the center position of the opening of tool bit attachment groove 54 on the side face of tool block 58 in the plan view of FIG. 9. In tool holder 50 of the present embodiment, pull stud bolt 56 is arranged at range 131P identified as one of ranges 131P and 131Q.

Pull stud bolt 56 may be located, not at range 131P where tool bit attachment groove 54 is provided, but at range 131Q of the opposite side.

In the present embodiment, one pull stud bolt 56 is provided at tool holder 50, corresponding to the configuration in which one auxiliary clamp 41 is provided at spindle housing 26. When a plurality of auxiliary clamps 41 are provided at spindle housing 26, a pull stud bolt 56 is to be provided at a position corresponding to each of auxiliary clamps 41. In this case, all pull stub bolts 56 are to be arranged at one of ranges 131P and 131Q.

By accommodating all pull stud bolts 56, irrespective of the number of pull stud bolts 56 provided, at one of ranges 131P and 131Q according to the configuration set forth above, the other of ranges 131P and 131Q can be utilized as the region for conducting tool exchange by automatic tool changer 70.

A basic configuration of tool holder 50 of the present embodiment will be summarized in the following. A tool holder 50 of the present embodiment is employed in a machine tool 10 having a turning function and a milling function, and is loaded to spindle 21 of machine tool 10 during a turning process. Tool holder 50 is exchangeable by automatic tool changer 70. Tool holder 50 includes a shank 52 as the tapered section, a pull stud bolt 51 as a main retraction section, a pull stud bolt 56 as at least one auxiliary retraction section, and a tool block 58 as a block member.

Shank 52 is formed with a tapered face 52a where the diameter varies along the axial line of central axis 111 as a predetermined axis. Pull stud bolt 51 is provided on the axial line of central axis 111, and receives a pulling force from the spindle side of machine tool 10 along the direction of the axial line of central axis 111. At least one pull stud bolt 56 is positioned radially apart from central axis 111 and receives a pulling force from the spindle side of machine tool 10 in a direction parallel to pull stud bolt 51. Tool block 58 includes, at a site radially apart from central axis 111, a tool bit attachment groove 54 as a tool bit attachment section to which tool bit 55 for use in a turning process is attached in a detachable manner. Tool block 58 has shank 52, pull stud bolt 51, and pull stud bolt 56 formed continuously thereto. All pull stud bolts 56 are arranged at a range 131P that is one of ranges 131P and 131Q, where range 131P is defined as the first range spanning over the angle of 180° centered on the phase angle where tool bit attachment groove 54 is provided, and range 131Q is defined as the second range spanning over an angle of 180° at the opposite side thereof, around the axis of central axis 111.

Although the present embodiment shows a general tool shank having a tapered face 52a of the inclination of 7/24 in FIGS. 8 and 9, the specification of the tool shank is not particularly limited in the present invention. For example, various types of 2-face restraint tool shanks having an inclination of 1/10 for the tapered face, for example, may be used.

By employing a tool clamp mechanism including an auxiliary clamp 41 according to machine tool 10 and tool holder 50 in the embodiment of the present invention, configured as set forth above, tool holder 50 can be held at the spindle side of machine tool 10 by a clamping force sufficient to withstand the load imposed during a turning process. Moreover, tool exchange by the double arm scheme can be carried out according to a configuration in which interference between double arm 71 moving during tool exchange and auxiliary clamp 41 is avoided. Thus, the tool exchange operation can be performed in a short period of time.

The present invention is mainly applied to a machine tool having a turning function using a fixed tool and a milling function using a rotary tool.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A machine tool having a lathing function using a rotationally fixed tool and a milling function using a rotary tool, comprising:
    a rotatable spindle,
    a housing member supporting said spindle in a rotatable manner,
    a main clamp provided at said spindle for clamping a fixed-tool tool holder during fixing the fixed tool and for clamping a rotary-tool tool holder during fixing the rotary tool,
    an auxiliary clamp provided at said housing member for clamping the fixed-tool tool holder, together with said main clamp, during fixing the fixed tool, and
    an arm member including a first gripper and a second gripper capable of grasping the tool holders, for exchanging one of said tool holders that is loaded to said spindle and grasped at said first gripper for another one of said tool holders that is grasped at said second gripper, which exchanging occurs by rotating the arm member about a central axis arranged at a center position of the arm member between said first gripper and said second gripper, and by sliding the arm member in an axial direction of the central axis,
    said auxiliary clamp being arranged at a position not interfering with said arm member during the rotation and axial movement of the arm member during the exchanging of the tool holders, wherein when viewed in a direction of a rotation axis of said spindle, the auxiliary clamp is located outside of a rotation region constituted by the area over which said arm member rotates during the rotation of the arm member about the central axis during the exchanging of the tool holders;
    wherein said auxiliary clamp is spaced from the spindle rotation axis, and
    wherein said auxiliary clamp includes a releasable collet for clamping a pull stud of the fixed-tool tool holder, and includes a tapered face whose diameter varies along a retracting direction along which the fixed-tool tool holder is retracted in order to clamp the fixed-tool tool holder with the auxiliary clamp,
    wherein the tapered face is configured to be in surface-contact with a tapered face of the fixed-tool tool holder, which tapered face of the auxiliary clamp is spaced along the retracting direction from the collet when the pull stud is clamped by the collet.

2. The machine tool according to claim 1, wherein when viewed in the direction of the rotation axis of said spindle, the rotation region overlaps a surface of said housing member.

3. The machine tool according to claim 1, wherein said auxiliary clamp is arranged at a side of the spindle that is opposite with respect to a side of the spindle where the center axis of rotation of said arm member is located.

4. The machine tool according to claim 1, wherein said auxiliary clamp includes a collet open-and-close member for selectively opening and closing the releasable collet.

5. The machine tool according to claim 1, wherein said auxiliary clamp includes a body having a hole formed therein, and wherein said collet is arranged in said hole,
    said machine tool further comprising a lid member attached to said body in a detachable manner for blocking the opening of said hole when the fixed-tool tool holder is not clamped by said auxiliary clamp.

* * * * *